United States Patent
McCarthy-Howe et al.

(10) Patent No.: US 9,762,734 B1
(45) Date of Patent: Sep. 12, 2017

(54) INTERMEDIARY DEVICE FOR DATA MESSAGE NETWORK ROUTING

(71) Applicant: TEN DIGIT Communications LLC, Simsbury, CT (US)

(72) Inventors: Thomas Spencer McCarthy-Howe, West Barnstable, MA (US); Gary George Brandt, Simsbury, CT (US)

(73) Assignee: TEN DIGIT COMMUNICATIONS LLC, Simsbury, CT (US)

( * ) Notice: Subject to any disclaimer, the term of this patent is extended or adjusted under 35 U.S.C. 154(b) by 0 days.

(21) Appl. No.: 15/411,321

(22) Filed: Jan. 20, 2017

(51) Int. Cl.
  *H04M 3/51* (2006.01)
  *H04L 29/08* (2006.01)
  *H04M 3/523* (2006.01)

(52) U.S. Cl.
  CPC ........ *H04M 3/5183* (2013.01); *H04L 67/146* (2013.01); *H04M 3/523* (2013.01); *H04M 2203/256* (2013.01)

(58) Field of Classification Search
  None
  See application file for complete search history.

(56) References Cited

U.S. PATENT DOCUMENTS

| | | | | |
|---|---|---|---|---|
| 5,724,418 A * | 3/1998 | Brady | ............... | H04M 3/42323 379/22 |
| 7,558,861 B1 * | 7/2009 | Qidwai | ............... | H04L 67/142 709/201 |
| 8,463,304 B2 | 6/2013 | Lauer et al. | | |
| 9,106,724 B1 * | 8/2015 | Harris | ............... | H04L 51/16 |
| 2001/0011366 A1 * | 8/2001 | Beck | ............... | G06F 9/45512 717/100 |
| 2010/0210291 A1 * | 8/2010 | Lauer | ............... | H04W 4/14 455/466 |
| 2010/0296646 A1 * | 11/2010 | Hemm | ............... | G06Q 10/107 379/265.02 |
| 2013/0028396 A1 * | 1/2013 | Pasi | ............... | H04M 3/523 379/67.1 |

* cited by examiner

*Primary Examiner* — Harry S Hong
(74) *Attorney, Agent, or Firm* — Foley & Lardner LLP; James De Vellis

(57) ABSTRACT

Systems and methods that enhance or route data messages, for example by optimizing transmission of data packets through a computer network between devices is provided. The intermediary device can receive a data message having a characteristic. A session management mechanism can identify, based on the characteristic of the message and a characteristic of a pre-existing session, a tuple. Based on the tuple, the session management mechanism can modify the pre-existing session to generate a modified pre-existing session that includes the data message. A session lobby mechanism can obtain an indication of the modified pre-existing session and can pool the modified pre-existing session with a plurality of additional sessions. Responsive to a selection received by the session assignment mechanism from a live interaction component of a contact center agent computing device, the session assignment mechanism can provide the modified pre-existing session to a contact center agent computing device.

21 Claims, 5 Drawing Sheets

INTERMEDIARY DEVICE FOR DATA MESSAGE NETWORK ROUTING

BACKGROUND

Voice based communication between computing devices can be limited to one to one direct communication, with limited ability for many-to-one parallel or concurrent communication.

SUMMARY

At least one aspect is directed to an intermediary device to route text based data messages. The intermediary device can disposed in a data communication path between an electronic communications network and a client computing device. The intermediary device can include at least one of a session management mechanism, a session storage unit, a session lobby mechanism, and a session assignment mechanism. The intermediary device can be disposed to receive, via the electronic communications network, a data message having a characteristic. The session management mechanism can identify, based on the characteristic of the message and a characteristic of a pre-existing session, a tuple. The tuple can indicate that the data message corresponds to the pre-existing session. The session management mechanism can modify the pre-existing session to generate a modified pre-existing session that includes the data message. The session lobby mechanism can obtain from the session storage unit an indication of the modified pre-existing session and can pool the modified pre-existing session with a plurality of additional sessions. Responsive to a selection received by the session assignment mechanism from a live interaction component of a contact center agent computing device, the session assignment mechanism can provide the modified pre-existing session to the live interaction component of the contact center agent computing device for display by a user interface of the contact center agent computing device.

At least one aspect is directed to a method of managing, via an intermediary device, text based data messages. The method can include providing an intermediary device to dispose in a data communication path between an electronic communications network and a client computing device. The intermediary device can include at least one of a session management mechanism, a session storage unit, a session lobby mechanism, and a session assignment mechanism. The method can include receiving, by the intermediary device, via the electronic communications network, a data message having a characteristic. The method can include identifying, by the session management mechanism, based on the characteristic of the message and a characteristic of a pre-existing session, a tuple. The tuple can indicate that the data message corresponds to the pre-existing session. The method can include modifying, by the session management mechanism, the pre-existing session to generate a modified pre-existing session that includes the data message. The method can include obtaining, by the session lobby mechanism from the session storage unit an indication of the modified pre-existing session and the method can include pooling the modified pre-existing session with a plurality of additional sessions. The method can include providing, by the session assignment mechanism, responsive to a selection received by the session assignment mechanism from a live interaction component of a contact center agent computing device, the modified pre-existing session to the live interaction component of the contact center agent computing device. The modified pre-existing session can be displayed by a user interface of the contact center agent computing device.

At least one aspect is directed to a computer readable storage medium storing instructions that when executed by one or more data processors, cause the one or more data processors to perform operations to manage text based data messages. The operations can include providing an intermediary device to dispose in a data communication path between an electronic communications network and a client computing device. The intermediary device can include at least one of a session management mechanism, a session storage unit, a session lobby mechanism, and a session assignment mechanism. The operations can include receiving via the electronic communications network, a data message having a characteristic. The operations can include identifying, by the session management mechanism, based on the characteristic of the message and a characteristic of a pre-existing session, a tuple. The tuple can indicate that the data message corresponds to the pre-existing session. The operations can include modifying, by the session management mechanism, the pre-existing session to generate a modified pre-existing session that includes the data message. The operations can include obtaining, by the session lobby mechanism from the session storage unit an indication of the modified pre-existing session and the method can include pooling the modified pre-existing session with a plurality of additional sessions. The operations can include providing, by the session assignment mechanism, responsive to a selection received by the session assignment mechanism from a live interaction component of a contact center agent computing device, the modified pre-existing session to the live interaction component of the contact center agent computing device for display by a user interface of the contact center agent computing device.

These and other aspects and implementations are discussed in detail below. The foregoing information and the following detailed description include illustrative examples of various aspects and implementations, and provide an overview or framework for understanding the nature and character of the claimed aspects and implementations. The drawings provide illustration and a further understanding of the various aspects and implementations, and are incorporated in and constitute a part of this specification.

BRIEF DESCRIPTION OF THE DRAWINGS

The accompanying drawings are not intended to be drawn to scale. Like reference numbers and designations in the various drawings indicate like elements. For purposes of clarity, not every component may be labeled in every drawing. In the drawings.

DETAILED DESCRIPTION

Following below are more detailed descriptions of various concepts related to, and implementations of, methods, apparatuses, and systems of data message routing, enhancement, or management in a contact center environment. The various concepts introduced above and discussed in greater detail below may be implemented in any of numerous ways.

Systems and methods of the present disclosure relate generally to an intermediary device for data message routing or enhancement, including network based data packet transmission, and corresponding systems, methods, and apparatuses. Text or other data messages can replace voice based communications via a computer network, for example to a contact center agent in a contact center environment. Routing, aggregating, enhancing, merging or associating individual data messages is a technical problem for an intermediary device that can be part of a data processing system in a contact center environment. For example, multiple text or other protocol based data messages can be asynchronous or time shifted. These data messages might be not be overtly linked with one another, such as a first data message to a cable company contact center about a bill and a second data message the next day to the same contact center, from the same source, that is about a change in address. There may be a number of contact center agent computing devices equipped to receive these data messages. Routing data messages to the incorrect or inappropriate contact center agent computing device, where they may need to be re-routed, leads to unnecessary increased computer network transmissions, increased network traffic and latency, unnecessary increased computer processing usage and a corresponding waste of electrical power.

The intermediary device described herein provides a technical solution to the above and other technical problems by, for example, employing a session lobby mechanism (among other components) to pool or allocate data message sessions between client computing devices (e.g., end users) and contact center agent computing devices. The intermediary device and other system components can modify pre-existing sessions to include newly received data messages and can pool or cluster the sessions together for efficient or direct assignment to the appropriate contact center agent computing device. This reduces the number of packet (or other protocol based) computer network transmissions that may otherwise occur due to inefficient routing to, for example, multiple contact center agent computing devices before arriving at the correct destination. This saves bandwidth, reduces latency, saves power, and results in faster communication between the end user computing device and the correct contact center agent computing device.

Figure 1:
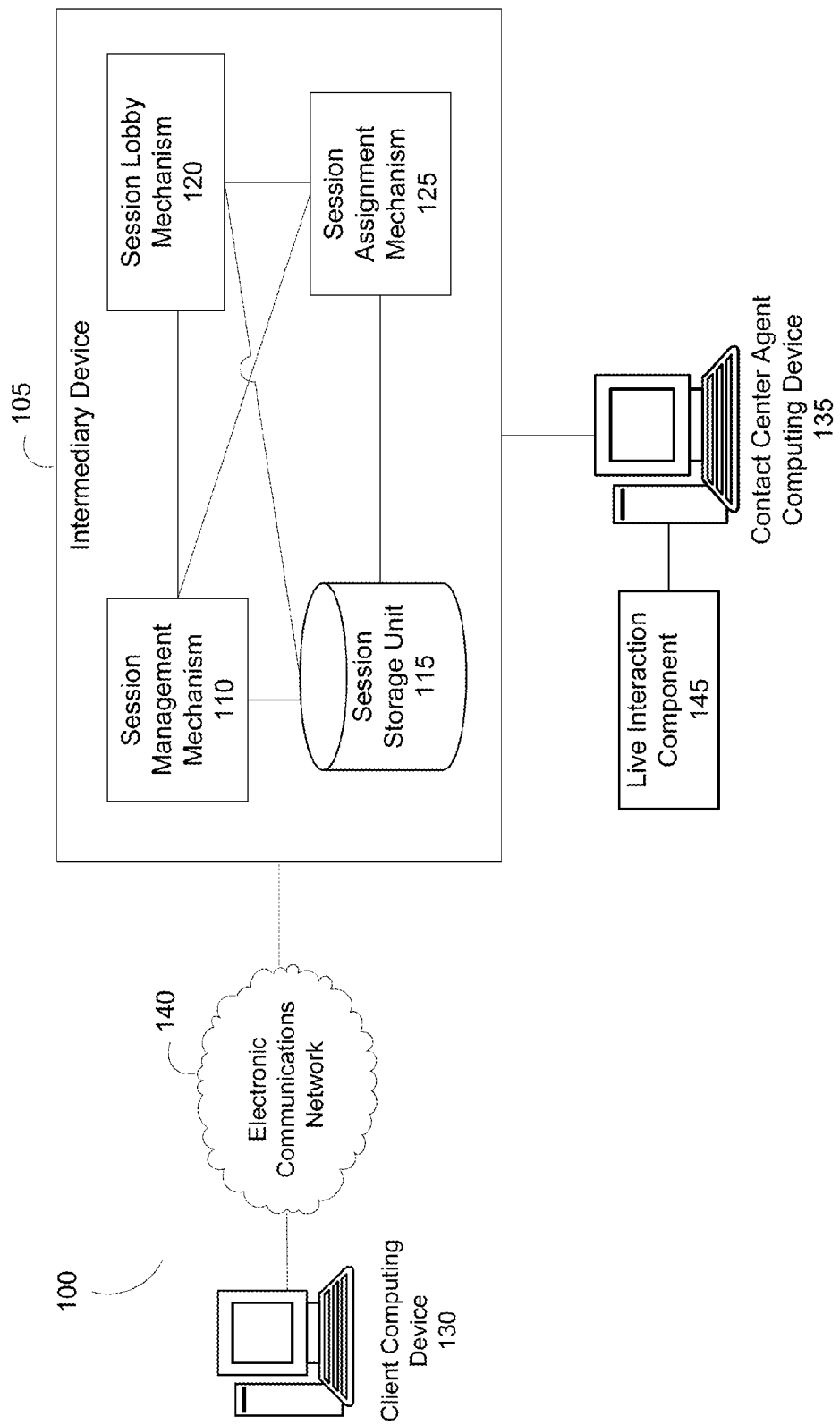
FIG. 1 is a block diagram of an example system that enhances or routes data messages.

FIG. 1 illustrates an example system 100 to route text based data messages. The system 100 can include at least one intermediary device 105. The intermediary device 105 can include at least one session management mechanism 110, at least one session storage unit 115, at least one session lobby mechanism 120, and at least one session assignment mechanism 125. The intermediary device 105 can be or include one or more data processing systems, servers, virtual servers, or computing devices. The intermediary device 105 can include hardware (e.g., processors of one or more servers), as well as scripts or programs executed by the hardware, and combinations thereof. The intermediary device 105 can reside (e.g., be physically or logically disposed) in an electronic communication path between at least one client computing device 130 and at least one contact center agent computing device 135. For example, the intermediary device 105 can communicate, (e.g., via a LAN, WAN, the internet, a cloud environment, or other computer network) with contact center agent computing devices 135 and with client computing devices 130. Data communication messages such as text messages or asynchronous voice messages (e.g., that are sent as a voicemail message and not part of a live conversation) can pass between an electronic communications network 140 and the contact center agent computing device 135, for example for display by the contact center agent computing device 135 or by the client computing device 130. The intermediary device 105 can enhance contact center operation by providing an operator of the contact center agent computing device 135 with the ability to live text with multiple client computing devices 130 during one time period, to effect continuous conversation with multiple end users during consecutive or intermittent time period that can range from seconds to days.

The intermediary device 105 can include the session management mechanism 110, the session storage unit 115, the session lobby mechanism 120, or the session assignment mechanism 125 as part of one or more servers of a contact center system to establish, modify, enhance or provide communication sessions between the client computing device 130 and the contact center agent computing device 135. The sessions can include asynchronous text, voice message, or data message (e.g., not a live voice conversation such as a telephone call) communications between an end user and a contact center agent (e.g., a person, bot, or combination thereof) related to a certain task, such as to change account information or to obtain customer service. In some examples, the intermediary device 105 can receive voice messages that have been sent as audio messages (voicemail) or converted into text messages. The sessions can occur continuously in a conversational manner, or can be intermittent, e.g., lasting over hours, days or weeks with dormant periods between communications. The intermediary device 105 can include at least one server. For example, the intermediary device 105 can include a plurality of servers located in at least one data center or server farm. The intermediary device 105 can receive data messages and can identify characteristics of those data message, for example as part of a contact center operation. Based on characteristics of the data messages, the intermediary device 105 can determine that a data message is (or is not) part of a pre-existing session between the contact center agent computing device and the client computing device 130. The intermediary device 105 can modify at least one pre-existing session to include a data message, and can pool a plurality of sessions together. The intermediary device 105 can provide one or more of the sessions to at least one contact center agent computing device 135.

The intermediary device 105, the session management mechanism 110, the session lobby mechanism 120, and the session assignment mechanism 125 can each include at least one processing unit, server, virtual server, circuit, engine, agent, appliance, or other logic device such as programmable logic arrays configured to communicate with the session storage unit 115 and with other computing devices (e.g., the client computing device 130 or the contact center agent computing device 135). These communications can occur via the network 140. The intermediary device 105 can include the session management mechanism 110, the session lobby mechanism 120, and the session assignment mechanism 125 as a single device (data processing system) or as separate devices. For example, the session management mechanism 110, the session lobby mechanism 120, and the session assignment mechanism 125 can be distributed across one or more than one server or virtual server in data center(s) in one or more physical locations. The session management mechanism 110, the session lobby mechanism 120, and the session assignment mechanism 125 can be part of the same physical device (e.g., a server) or can be installed on separate devices.

The intermediary device 105 can include at least one data processing system e.g., at least one logic device such as a computing device or server having a processor to communicate with at least one client computing device 130 or at least one contact center agent computing device 135. The intermediary device 105 can also communicate via the computer network 140 (e.g., that is or includes a LAN or other network) with at least one contact center agent computing device 135 in a call or contact center environment. The client computing device 130 and the contact center agent computing device 135 can include a desktop, laptop, tablet, smartphone, flip phone, personal digital assistant, server, client, thin client, end user, mobile, or other computing device. The contact center agent computing device 135 can include a computing device workstation in a contact center or call center environment. The contact center agent computing device 135 can include at least one live interaction component 145, e.g., a script that executes at the contact center agent computing device 135 (or remotely) to provide a chat window, display, or other user interface at the contact center agent computing device 135.

The intermediary device 105 can connect with messaging networks 140 for the sending and receiving of text based messages. This connection can be made through either software based application programming interfaces, or telecom stack protocols such as short message peer to peer protocols. The intermediary device 105 supports connections to multiple networks 140. The messaging networks 140 and session management mechanism 110 can exchange fixed length messages, in various text formats such as ASCII, XML and HTML, that result in network traffic.

The client computing device 130 and the contact center agent computing device 135 can include user interfaces such as microphones, speakers, touchscreens, displays, keyboards, pointing devices, a computer mouse, touchpad, or other input or output interfaces. The client computing device 130 and the contact center agent computing device 135 can receive, display, modify, or transmit a variety of different data message types, such as text, binary, video, image, voice message, still photography or other types of rich content. The client computing device 130 and the contact center agent computing device 135 can initiate, transmit, or receive discrete communication elements such as text messages, chat messages, app based messages, emoji's, images, video clips and other rich media, e.g., from the intermediary device 105 or from the network 140.

The electronic communications network 140 can include computer networks such as the internet, local, wide, metro or other area networks, intranets, satellite networks, other computer networks such as voice or data mobile phone communication networks, and combinations thereof. The network 140 can include at least one messaging network that transmits text or other data messages that may but need not include the internet. The network 140 can carry or transmit various data message types, such as text, binary, video, image, voice message, still photography, hyperlinks, or active instructions to accomplish tasks, or other types of rich content for example.

The session management mechanism 110, the session lobby mechanism 120, and the session assignment mechanism 125 can include or execute at least one computer program or at least one script. The session management mechanism 110, the session lobby mechanism 120, and the session assignment mechanism 125 can be separate components, a single component, or part of the intermediary device 105. The session management mechanism 110, the session lobby mechanism 120, and the session assignment mechanism 125 can include combinations of software and hardware, such as one or more processors configured to receive data messages, determine that data messages do or do not correspond to pre-existing sessions between client computing device 130 and the contact center agent computing device 135, modify pre-existing sessions to include data messages, store and pool sessions, and provide sessions to the contact center agent computing device 135, for example.

The session storage unit 115 can include at least one local, remote, encrypted, unencrypted, or distributed database or memory (including any associated database management system), and combinations thereof that can receive and provide data to and from the intermediary device 105 or its components as well as the client computing device 130 or the contact center agent computing device 135. The session storage unit 115 can reside entirely or in part of at least one the intermediary device 105, the contact center agent computing device 135 or third party computing devices.

The system 100 can include the intermediary device 105 to route text based data messages. For example, the intermediary device 105 can be disposed in a data communication path between the network 140 and the client computing device 130. The intermediary device 105 can be part of or in communication with a contact center environment. For example, all or part of the intermediary device 105 can be installed on one or more servers that provide services to a contact center. Portions of the intermediary device 105 such as scripts can be installed at the contact center agent computing device 135. The intermediary device 105 can receive a text based data message. For example, via the network 140, the intermediary device 105 can communicate with (e.g., receive or transmit data messages to or from) at least one end user or client computing device 130.

The intermediary device 105 can receive a data message via the network 140. The data message can be a text message sent from the client computing device 130 to a contact center environment, e.g., intended for the contact center agent computing device 135. The intermediary device 105 can receive the data message via the network 140, which can include a fixed line (e.g., from the signaling channel of an acoustic modem), wireless network, internet, VoIP, cellular, PSTN, fiber optic, SMS or public or proprietary text messaging networks. The data message can be text or image based rather than a human or automated audio or voice transmission. The data message can also be an asynchronous voice transmission (e.g., a voicemail or voice message) that is recorded by the client computing device 130 and then transmitted, rather than a live voice conversation.

The text based data message can include one or more characteristics. Characteristics of the data message can indicate a source of the data message, such as the device from which the data message originated, a network account or social network account from which the data message originated, or an individual from which the data message originated. For example, packet or other protocol based transmissions of data messages can include a media access control address, network interface controller, Ethernet hardware address, programmed address, or other identifier that identifies the client computing device 130 (e.g., a smartphone or tablet).

For example, the characteristic can include a handle or other reference to a resource or username in a communication system (e.g., '@username' of a social network or communication service) or an email address. The characteristic can also include an account identifier (e.g., a phone number of a smartphone or identifier of a social media or email account), serial number, or other device identifier. The characteristic can accompany the text based data message transmitted from the client computing device 130 and received by the intermediary device 105, e.g., on behalf of a contact center. For example, the characteristic can be included within or appended to packet or other protocol based transmissions of the data message through the network 140. The characteristic can also be indicated by metadata or header information that is part of or transmitted with the data message.

The intermediary device 105 can create and modify sessions for use in a contact center environment. For example an end user at the client computing device 130 may have a question about a cable television bill and may send a text or other text-based data message to a contact center to obtain assistance from a representative. Data messages can be asynchronous, e.g., one-way, separated in time or having different subject matter content. The intermediary device 105 in the contact center environment can determine that data messages are (or are not) part of a pre-existing session. The session can be a text based communication session between the end user (at the client computing device 130) and a contact center agent or other representative at the contact center agent computing device 135. Multiple individual data messages can be aggregated or clustered together to form or define a session. For example, a series of back and forth text messages between the client computing device 130 and the contact center agent computing device 135 that pertain to common subject matter such as a billing query can be identified by the intermediary device 105 as a session. The intermediary device 105 can provide the sessions for storage in and retrieval from the session storage unit 115.

Pre-existing sessions, or the text based data messages that make up the pre-existing session can include one or more characteristics. For example, the characteristic of the pre-existing session can include one or more destination identifiers. The destination identifiers can indicate a destination of the data messages such as a name of the cable company or other entity that the end user is in contact with or attempting to contact to, for example, resolve a dispute or update account information. In addition to a name, the destination identifiers can include social media service handles or other information that identifies an entity or person.

The intermediary device 105 can receive or obtain an inbound data message from the client computing device 130, (e.g., via the network 140) and can determine that the data message is part of a pre-existing session (e.g., stored in the session storage unit 115) or is part of a new session. For example, the session management mechanism 110 (or other intermediary device 105 component) can determine or identify the presence of a tuple or other ordered pair. The presence of a tuple can indicate that the new or incoming data message under evaluation by the intermediary device 105 is part of a pre-existing session, such as a text message based conversation between the end user and a contact center agent.

The session management mechanism 110 can parse or evaluate the data message (including any metadata such as a location, keyword, topic, or phone number) to identify at least one characteristic of the data message (e.g., an identifier of the end user or of the client computing device 130). For example, informational data messages can include source and destination addresses, formatted such as @thomas for social networks or +15085551212 for mobile telcom networks, along with the payload of the message, such as "I have a problem with my bill", and various meta-data about the message such as the time of creation, a unique identifier for the message, or a Boolean flag indicating whether or not the data message has been delivered before.

The session management mechanism 110 can identify the tuple based on the characteristic of the data message and a characteristic of the pre-existing session (e.g., a destination identifier indicating, for example, a utility company). For example, an end user having the handle identifier, "@Thomas" could send a text based data message via a social network, text messaging app, or other communications platform to the utility company having the destination identifier "@CableCo." The session management mechanism 110 can query the session storage unit 115 (where pre-existing sessions or indications of pre-existing sessions are stored) to determine that pre-existing sessions with a matching tuple (e.g., "@Thomas" and "@CableCo") do or do not exist. Existence of a matching tuple associated with the pre-existing sessions in the session storage unit 115 can indicate that Thomas is already in contact with the Cable Company via the pre-existing session.

Based on this match the session management mechanism 110 can modify the pre-existing session between Thomas and the Cable Company to include the (new) data message sent from "@Thomas" to "@Cable Company". In this example, the tuple of the data message indicates that the data message corresponds to a pre-existing session. Telephone numbers of the client computing device 130 or other characteristics can be used as part of the tuples or to indicate a common thread or characteristic among the data messages. The session management mechanism 110 (or other intermediary device 105 component) can provide the modified pre-existing session to the session storage unit 115 for storage. The session management mechanism 110 (or other intermediary device 105 component) can provide all or part of the modified pre-existing session to the contact center agent computing device 135 or to the client computing device 130. The session management mechanism 110 (or other intermediary device 105 component) can modify the pre-existing session to include the data message by appending the new data message to the list of existing session messages. In addition, the session management mechanism 110 can tag new data messages with a unique identifier of the pre-existing session, allowing for future processing by the intermediary device 105 optimized for data message processing.

The session management mechanism 110 can assemble or aggregate data messages into logical groups called sessions. Unlike other real time communications modes like audio and video that have an explicit start and stop to a conversation, data messages via messaging based networks can be considered stateless, e.g., without explicit indications of beginnings and ends of conversations, such as disconnecting a voice call. The session management mechanism 110 can mark the beginning and end of sessions, e.g., conversations. The intermediary device 105 can append newly received data messages to a pre-existing session, or can create a new session for the data message. The session management mechanism 110 can connect with the session storage unit 115 to insert incoming data messages or to retrieve outgoing data messages for transmission via the network(s) 140. The session management mechanism 110 can also collect meta-data information about the source of the inbound data message, including characteristics such as the network identifier, messaging network, device location, and in the case of social messaging or with end user consent, details such as the parties name or telephone number. The session management mechanism can send a confirmation receipt message to the originating party, responsive to receipt of a data message.

The intermediary device 105 or component thereof such as the session assignment mechanism 125 can determine that the inbound text based data message is a new session when no tuple corresponding to a pre-existing session exists. The session management mechanism 110 can provide the new session to the session storage unit 115 for storage.

The session management mechanism 110 can determine that a data message is associated with a pre-existing session based on a direct match between the data message tuple and data about the pre-existing sessions. For example, with a direct match the session management mechanism 110 can determine that the same "'@Thomas' '@Cable Co'" tuple from the (new) data message exists for a pre-existing session, stored in the session storage unit 115. This indicates that the user having the handle identifier @Thomas has already sent data message communications to the destination having the destination identifier @Cable Co.

The session management mechanism 110 can also determine that the data message is part of a pre-existing session based additional information beyond a match between the tuple of the data message and stored information about a pre-existing session. For example, the session management mechanism 110 can identify a data message from @Thomas to @Cable Co that was received today, and can identify a pre-existing session between @Thomas and @Cable Co from one year ago. Based, for example, on the one year time gap, (or a time period greater than a threshold value), the session management mechanism 110 can evaluate subject matter of the data message and of the pre-existing session to see if there is subject matter match. For example, today's data message can include the terms "overcharge on my bill" and the pre-existing session can include the terms "address change". Or the session management mechanism 110 can determine that the data messages of the pre-existing session do not include the terms "overcharge" or "bill". Based on the different subject matter the session management mechanism 110 can determine that a tuple-based match does not exist between the data message and the pre-existing session due to the differences in subject matter, despite a direct match between the tuple of the data message and a tuple associated with the pre-existing session. In these and other examples, the session management mechanism 110 can include subject matter comparisons (e.g., term based) or time thresholds (e.g., one year) between the (new) data message and last activity associated with the pre-existing session. The threshold or comparisons can be customized for individual customers or end users.

The handle identifier "@Thomas" and the destination identifier "@Cable Co" are examples and the characteristics of the data messages and of the pre-existing sessions. The characteristics of the data message can include other identifiers, such as subject matter terms, a phone numbers of the client computing device 130 or a device identifier of the client computing device 130. The characteristics of the pre-existing session can include destination phone numbers or other identifiers of the entity that is associated with the data message (e.g., that the end user is trying to reach).

The session lobby mechanism 120 can identify one or more pre-existing sessions. For example, the session lobby mechanism 120 can query to the session storage unit 115 to obtain this information, or the session management mechanism 110 can transmit an indication of one or more pre-existing sessions to the session lobby mechanism 120. The session lobby mechanism 120 can manage sessions as they are assigned to agents at the contact center agent computing devices 135. When sessions are created, they are not assigned to agents, yet must be to complete the session. The session lobby can include a construct that can store sessions until they are manually assigned at the request of an agent or supervisor, or until they are automatically assigned to an agent by the session assignment mechanism 125. By pooling sessions and establishing ownership of them prior to assignments, the session lobby construct provides a scale and reliability advantage. By existing in multiplicity in the system, dedicated hardware can be assigned to each lobby construct, allowing them to scale linearly. In addition, having multiple session lobbies assures that a failure of one or more session lobbies (to a failure maximum of N−1 session lobbies when N session lobbies exist in the system 100) does not disable the session lobby function, resulting in a more reliable system 100.

The session lobby mechanism 120 can determine that a pre-existing session has been modified. The session lobby mechanism 120 can be notified by the session storage unit 115 of the modification by a notification mechanism, avoiding the need for a continuous measurement and difference analysis. The session lobby mechanism 120 can pool the modified pre-existing session together with a plurality of other pre-existing sessions. The pooled pre-existing sessions can be stored in the session storage unit 115.

The session assignment mechanism 125 can provide pre-existing sessions, pooled by the session lobby mechanism 120, to the contact center agent computing device 135. For example, the live interaction component 145 of the contact center agent computing device 135 can select the modified or any other pre-existing session from the pooled pre-existing sessions. The selection can be arbitrary or based on factors, such as a prior routing of the pre-existing session to the computing device 135, subject matter of the messages of the pre-existing session, or source or destination information corresponding to messages of the pre-existing session. Responsive to a selection of the modified (or another) pre-existing session from the pool of available pre-existing sessions, the session assignment mechanism 125 can provide the modified pre-existing session (or other selected session) to the contact center agent computing device 135. For example, the session assignment mechanism 125 can assign or provide the selected session to the live interaction component 145 of the contact center agent computing device via the network 140 of other electronic transmission. The selected session can be provided for display by a display of the contact center agent computing device 135 for interaction with the contact center agent operating the device 135.

The session lobby mechanism 120 can consolidate pre-existing sessions into a lobby construct, e.g., a location in the session storage unit 115 where the pre-existing sessions can be universally accessed by the contact center agent computing devices 135. The session assignment mechanism 125 can affirmatively select and provide (e.g., push) a pre-existing session to one or more contact center agent computing devices 135. The contact center agent computing devices 135 can also affirmatively select (e.g., pull) a pre-existing session from the lobby construct of the intermediary device 105. For example, the contact center agent computing device 135 can retrieve or otherwise access or select the modified (or any other) pre-existing session subsequent to creation or classification of the modified pre-existing session by the session lobby mechanism 120.

Inbound text or data (e.g., non-voice) messages can be obtained by the intermediary device 105 from the client computing device 130. Based, for example, on the presence or absence of tuples (or of matches between tuples of a data message under examination and data messages of pre-existing sessions), the intermediary device 105 can classify the inbound data messages as part of a pre-existing session or as a new session. For example, the intermediary device 105 (e.g., the session management mechanism 110) can receive a first data message. Based, for example, on a tuple match the session management mechanism 110 can determine that the first data message is part of a pre-existing session. The session assignment mechanism 125 can assign the first data message to the pre-existing session. The intermediary device 105 modifies the pre-existing session to include the first data message as part of a modified pre-existing session. The session lobby mechanism 120 can include the modified pre-existing session in a lobby construct, e.g., a pool of existing pre-existing sessions maintained by the session storage unit 115.

The intermediary device 105 can receive a second data message having at least one characteristic. The second data message can be associated with a source identifier (e.g., "@Gary") and a destination (e.g., a phone number or destination address of a utility company) or other characteristics. The session management mechanism 110 can identify an absence of a tuple match between the second data message and the pre-existing sessions. For example, the second message may have the source-destination (or other characteristic) tuple "source:@Gary" and "dest:Phone Co". The session management mechanism 110 can determine that none of the pre-existing sessions have a matching tuple of "source:@Gary" and "dest:Phone Co". This indicates that no other data messages have been sent from the same source (e.g., Gary) to the same destination (e.g., a phone company). In this example, the session management mechanism 110 identifies an absence of a tuple based on characteristics of the second data message and characteristics of the pre-existing sessions (or characteristics of the data messages of the pre-existing sessions). Based on the absence of a tuple match between the second data message and the pre-existing sessions that the session lobby mechanism 120 has organized into a lobby construct, the session management mechanism 110 can identify the second data message as a new session. The session lobby mechanism 120 can pool, list or provide the new session as one of the plurality of sessions in the lobby construct, together with a plurality of pre-existing sessions. The session assignment mechanism 125 can provide the new session (or any of the pre-existing sessions) to a live interaction component 145 of at least one contact center agent computing device 135.

The characteristics of the data messages can indicate information about sources, destinations, logistics, timing information, or subject matter of the data messages. For example the characteristics can indicate a specific device (e.g., by device identifier), IP address, media access control address, unique identifier, or a type of device (e.g., a make, model, or brand of smartphone), or application. The session management mechanism 110 can identify characteristics of data messages as characteristics of application platforms, such as a particular text or chat messaging application, or social network, or a particular device or type of device. Different data messages can have different characteristics. For example, a first data message can include a characteristic of a first application platform indicating that the first data message was sent from a text message application that executes at the client computing device 130. The second data message can include a characteristic of a second application platform, indicating for example that the second message was sent via a social network app. The session management mechanism 110 can identify the first and second characteristics, and can determine whether or not they correspond to the same pre-existing session. Despite the first and second data messages having characteristics corresponding to different application platforms (e.g., one was sent via text message, the other via a social media message), the session management mechanism 110 can determine that both the first and second messages are part of one pre-existing session. For example, the session management mechanism 110 can determine that the first and second messages have common subject matter (e.g., a complaint about a cable bill, or a helpdesk request to operate a device), or that both the first and second message originated from the same client computing device 130 (but via different apps). Despite originating in different format (e.g., via different application platforms) the session management mechanism 110 can determine matching tuples between the data messages and tuples associated with pre-existing sessions to match the two data messages with the same pre-existing session. In this example, the session management mechanism 110 can determine that different data messages having characteristics indicating different platforms correspond to a pre-existing session.

The session management mechanism 110 can determine tuples or ordered pairs, such as a 2-tuple for each inbound data message received by the intermediary device 105. The session management mechanism 110 (or other intermediary device 105 component such as the session assignment mechanism 125) can identify the same or a related tuple from data messages of pre-existing sessions stored for example in the session storage unit 115.

For example, the intermediary device can receive a first data message, having at least one characteristic, and can determine a tuple for the first message. Based, for example, on a match between this tuple and at least one tuple of a data message of a pre-existing session, the session assignment mechanism 125 can assign the first data message to the pre-existing session. Continuing with this example, the intermediary device 105 can also receive a second data message having at least one characteristic, and the intermediary device 105 (e.g., the session management mechanism 110) can determine a second tuple for the second message. The first tuple and the second tuple can be the same or different from one another. The session assignment mechanism 125 can identify a match between the second tuple and at least one tuple of any data message of the same pre-existing session. This can be the same match or a different match as the match between the tuple of the first data message with a tuple of the pre-existing session. Based on the tuple-based analysis, the session assignment mechanism 125 can modify the pre-existing session to include the first data message and the second data message.

Figure 2:
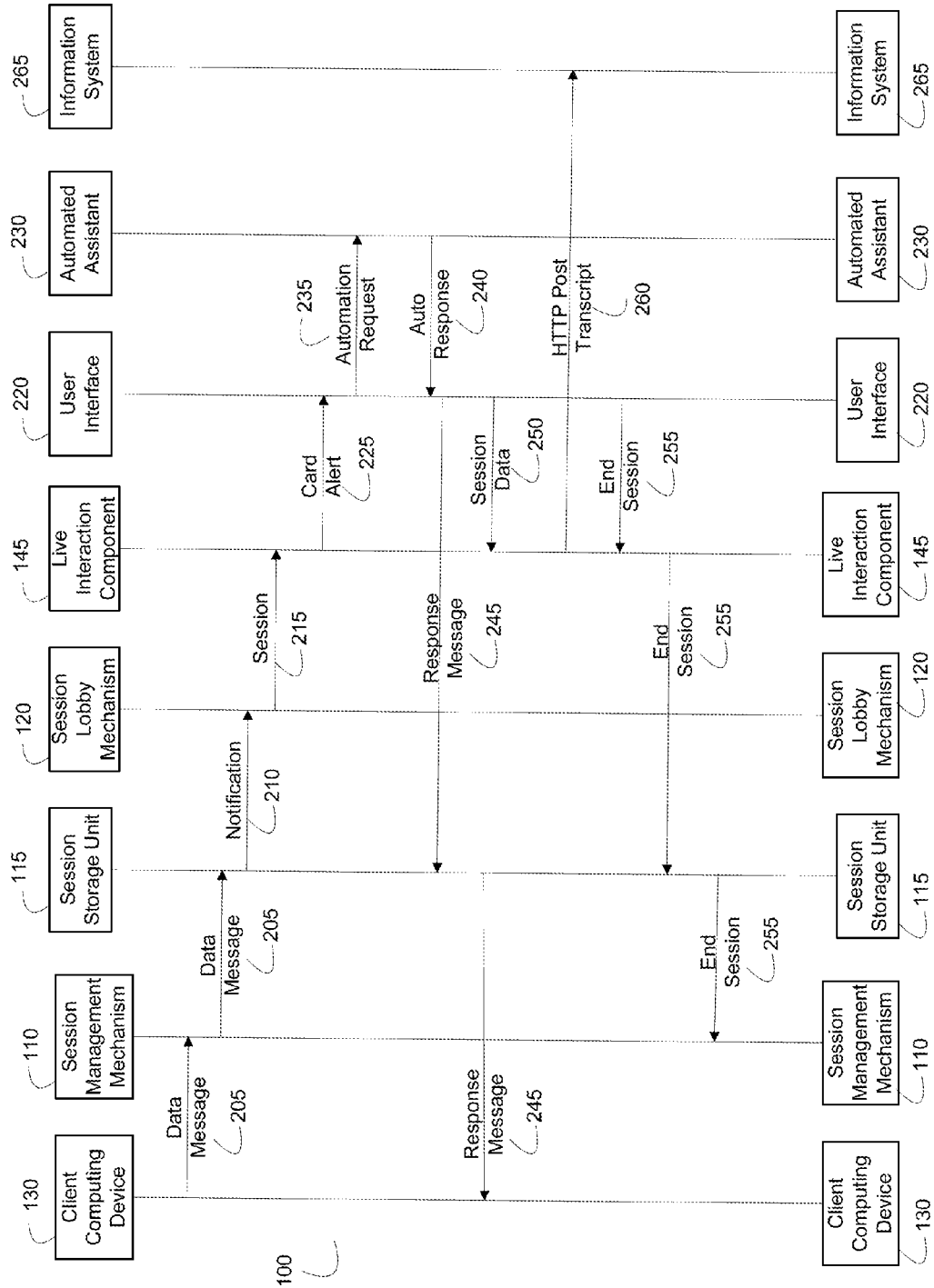
FIG. 2 is a functional diagram of an example system that enhances or routes data messages.

FIG. 2 is a functional diagram of the example system 100 that enhances or routes data messages. Referring to FIG. 1 and FIG. 2, among others, the system 100 can include a contact center environment (e.g., call center, customer service, or help desk environment that includes the capability to route, service, and respond to non-voice data message communications). The client computing device 130 can send at least one data message 205 via the electronic communications network 140 to the session management mechanism 110. The data message 205 can include at least one characteristic, such as source, destination, subject matter, end user, or computing device 130 information.

The session management mechanism 110 can receive the data message 205, and can provide the data message 205 for storage in the session storage unit 215. The session lobby mechanism 120 can receive a notification 210 that a new data message 205 has been provided to or stored the session storage unit 115. The session lobby mechanism 205 can query the session storage unit 215 for the notification 210, or the session storage unit 115 (or other components such as the session management mechanism 110) can provide the notification 210 to the session lobby mechanism 120. The session management mechanism 110 can determine that the data message 205 is part of a pre-existing session stored in the session storage unit 115. For example, the session management mechanism 110 can identify and compare at least one tuple of the data message 205 with at least one tuple of one or more messages of a pre-existing session. Based on a tuple match the session management mechanism 110 can determine that the data message 205 is part of a pre-existing session. If the data message 205 is part of a pre-existing session the session management mechanism 110 can modify the pre-existing session to include the data message 205. Based on an absence of a tuple match, the session management mechanism 110 can determine that the data message 205 is not part of a pre-existing session (e.g., is a data message of a new session).

The data message 205 (e.g., as a new session or as part of a modified pre-existing session) can reside in a lobby construct managed by the session lobby mechanism 120. The example the data message 205 or an indication of its existence can be stored in the session storage unit 115 with other data messages of one or more sessions. The session lobby mechanism 120 can assign the (new or pre-existing) session 215 that includes the data message 205 to at least one live interaction component 145 of at least one contact center agent computing device 135. The live interaction component 145 can include a script or program that executes to display a user interface 220 on the contact center agent computing device 135. The live interaction component 145 can be installed and can execute locally at the contact center agent computing device 135, or can be installed remotely (e.g., at a server in the data center independent of, associated with, or as part of the intermediary device 105) to provide the user interface 220 at the contact center agent computing device 135.

The sessions 215 can be stored in an independent component of the session storage unit 215 to allow other components in the system 100 to reference and react to them. For example, the session lobby mechanism 120 can subscribe to changes to the data held in the session storage unit 115, and can be notified when sessions 215 are created or modified. This notification process decouples the components, reducing the computational effort of the intermediary device 105 required to manage the session state and increasing the capacity of the system 100, while at the same time, reducing the latency between the establishment of a session 215 and the processing of it in the system 100. The sessions can be stored in the session storage unit 115 as information blocks, and can indicate the parties to a session 215, assignment state, keywords and other metrics or characteristics derived from the session 215. The session management mechanism 110 can manage the data blocks, and can drive behaviors from the session lobby mechanism 120, the session assignment mechanism 125, and the live interaction component 145. Data corresponding to the session 215 can also be explicitly identified as expired, or can be removed, for example to protect confidential details such as financial or health care data.

Sessions 215 that the session assignment mechanism 125 does not assign to a contact center agent computing device 135 can be held by the session lobby mechanism 120 in the lobby construct. The session lobby mechanism 120 provides the session assignment mechanism 125 (or a human operator) with the ability to determine how a data message 205 should be processed, e.g., by a particular contact center agent computing device 135 (under human control) or a particular bot (e.g., the automated assistant 230). Further, the assignment by the session assignment mechanism 125 of a session 215 to the lobby construct under control of the session lobby mechanism makes such assignments atomic, which can reduce race conditions between multiple parties assigning sessions 205 that increases the session capacity of the system 100. The session lobby mechanism 120 can receive indications of changes in the session storage unit 115, can receive session objects (e.g., data messages 205 or related information) from the session storage unit 115, and can provide the session objects to the contact center agent computing device 135 (e.g., the live interaction component 145) for visual display, for example to allow for manual assignment from the agent at the computing device 135.

The session assignment mechanism 125 can assign the sessions 215. The session assignment mechanism 125 can increase the efficiency of the system 100 by reducing or eliminating the need for humans to make decisions about how sessions 215 should be handled. In addition, the encapsulation of assignment logic by the session assignment mechanism 125 enables the deployment of multiple assignment strategies of sessions 215, (e.g., assignment to the least loaded contact center agent computing device 135, or assignment to agents who have previously interacted with the session 215). The session assignment mechanism 125 can subscribe to changes in the session storage unit 115, can receive the session objects (e.g., the data messages 205 or other session 215 information) from the session storage unit 115. Based, for example, on an automated assignment strategy, the session assignment mechanism can assign the session 215 (or data message 205 thereof) to an identified live interaction component 145. The session assignment mechanism 125 can be enabled or disabled on request of at least one contact center agent computing device 135. Upon or subsequent to assignment of the session 215 to the live interaction component 145, the session assignment mechanism 125 can request updates from the session storage unit 115 to indicate which live interaction component 145 is responsible for the session 215.

The live interaction component 145 can provide the data message 205, e.g., in a card format, for display in the agent user interface 220 for interaction with a human or automated operator of the contact center agent computing device 135. For example, the live interaction component 145 can provide a card alert notification 225 to the contact center agent computing device 135 for rendering by or within the agent user interface 220. The card alert notification 225 can indicate that the session 215 (or at least one data message 205 thereof) is or has been assigned by the session assignment mechanism 125 to the contact center agent computing device 135. The data message 205 (or other session 215 information) can also be provided from the intermediary device 105 (or component thereof) to the contact center agent computing device 135 separate (e.g. concurrent or subsequent to the card alert notification.

The live interaction component 145 can provides efficient methods of messaging communications within a session 215 and between the client computing device 105, the automated assistant 130, and the control of an agent at the contact center agent computing device 135. By narrowing and isolating the integration points between these three actors, coordination between them is maximized while minimizing integration efforts. This permits scaling the capacity of the system 100 by adding processing resources. The live interaction component 145 can create new messages (e.g., session data 250) stored in the session storage unit 115 for transmission via the network 140 to the client computing device 130. Messages in sessions that arrive from external parties, such as the messaging network 140 or the automated assistant 230, can be packaged for display by the session management mechanism 110. To assist the agent at the computing device 135, the live interaction component 145 can obtain and display transcripts and other relevant data of one or more sessions 215 or data messages 205.

During live interactions (e.g., session transmissions), information systems can be integrated to support the agent and to increase operational efficiencies. For example, transcripts and collected data from the automated assistants 230 or the session storage unit 115 can be sent from the live interaction component 145 to the information system 265, eliminating the need for the controlling agent at the computing device 135 to do so. Information relative to the interaction, such as details on pre-existing or past sessions 215 with the same participants, can be obtained from the information system 265 and inserted into the session 215. Data interactions with the information system 265 can be in various text formats such as ASCII, XML and HTML, and managed by common control formats such as email or software application programming interfaces.

The contact center agent (e.g., a human operator) can interact with the agent user interface 220 to access the data message 205 or other information from the session 215. For example, the contact center environment can include a cable company, and the data message 205 can indicate "I think there is an overcharge on my bill" or other content. This information can be provided for display by the agent user interface 220. The contact center agent computing device 135 can route the data message 205 (or other information of the session 215) to at least one automated assistant component 230 with an automation request 235. In response or subsequent to the automation request 235 the automated assistant 230 can provide at least one auto response message 240, indicating for example, "ok, we can help you—what are the last four digits of your account number?" or other information.

The auto response message 240 can be generated by the automated assistant component 230, rather than a human operator. The automated assistant component 230 can transmit the auto response 240 to the client computing device 130, e.g., via the contact center agent computing device 135 or via intermediary device 105 components such as the session storage unit 115. For example, the auto response message 240 can be provided to the session storage unit 115 (for storage as part of the same pre-existing session as the data message 205) and can also be provided via the electronic communications network 140 to the client computing device 130. In some examples, the live interaction component 145 can receive the session 215, such as a modified pre-existing session that includes a (new) data message 205. Subsequent or responsive to receipt of the session 215, the session management mechanism 110 can routes or otherwise provide an automated message such as the auto response message 240 from the contact center agent computing device 135 or from the automated assistant component 230 to the client computing device 130.

The automated assistant component 230 can include at least one script or app that executes at the contact center agent computing device 135 or remotely (e.g., at the intermediary device 105 or a remote server). The automated assistant component 230 can auto response messages 240 responsive to data messages 205. The automated assistant component 230 can receive an instruction from the contact center agent computing device 135 (e.g., via the agent user interface 220 or the live interaction component 145) to generate or select an auto response message 240. The automated assistant component 230 can also generate the auto response message 240 responsive to receipt of the data message 205 without a request to do so being received from the contact center agent computing device 135.

The automated assistant components 230 can be invited by the automation request 235 into sessions 215 to provide conversational efficiencies relative to manual typing by the controlling agent at the computing device 135. In addition to conversational efficiencies, the automated assistants 230 in live interactions with client computing device 130 increases the consistency of interactions in relation to the variability from differing controlling agents. Communications with automated assistant components 230 can occur via the computer network 140, and the communications (e.g., the automation request 235 or the auto response 240) can be in various text formats such as ASCII, XML and HTML and data representations in text such as XML and JavaScript Object Notation (JSON).

Responsive to the card alert notification 225 and the data message 205, the contact center agent computing device 135 under control of a human agent can generate at least one response data message 245. The response message 245 can include a data or text (e.g., non-voice) message that prompts for information or is otherwise responsive to the data message 205. The response message 245 can be transmitted to the client computing device 130 as part of, concurrent with, prior to, or subsequent to the response message 245. The client computing device 130 can receive the response message 245 and respond with further data messages that are part of the same session as the data message 205, the auto response message 240, or the response message 245.

The contact center agent computing device 135 (or the client computing device 130) can end a session. For example, via the agent user interface 220 the agent operating the computing device 135 can provide a termination or end session instruction 255, and can store session data 250 using the live interaction component 145.

The contact center agent computing device 135 can directly interact and modify the existing session by appending new messages to the existing session. By decoupling the interactions between the session storage and the agent, from the session storage and the messaging network, the intermediary device 105 allows each connection to be optimized: the live interaction component 145 can achieve low latency, while the messaging network 140 can bulk or batch process data to handle large volumes of conversations and reduce the number or transmission time of individual communications. The contact center agent computing device 135 can provide an end session transmission 255 to the session storage unit 115 to indicate the session is terminated until further notice, such as the receipt of a new data message having a tuple that matches a tuple associated with the session. Via the agent user interface 220, the contact center agent computing device 135 can provide the end session transmission 255 to any of the live interaction component 145, the session storage unit 115, the session management mechanism 110, and the client computing device 130. The session management mechanism 110 can obtain or otherwise receive the end session instruction 255, e.g., an indication of termination of a session 205 such as a modified pre-existing session, from the contact center agent computing device 135.

The live interaction component 145 can provide session data, e.g., as an HTTP POST data 260 for storage by at least one information system 265, which can include at least one server having memory to store data messages 205 and other information associated with the sessions 215. For example, the HTTP POST data 260 can include transcripts of the session 215, or structured and validated data from automation assistants 230 that can be provided from the intermediary device 105 to at least one information system 265. Contextually significant data, such as account information associated with an end user, can by retrieved by the intermediary device 105 from information system 265 to assist the agent at the computing device 135.

Figure 3:
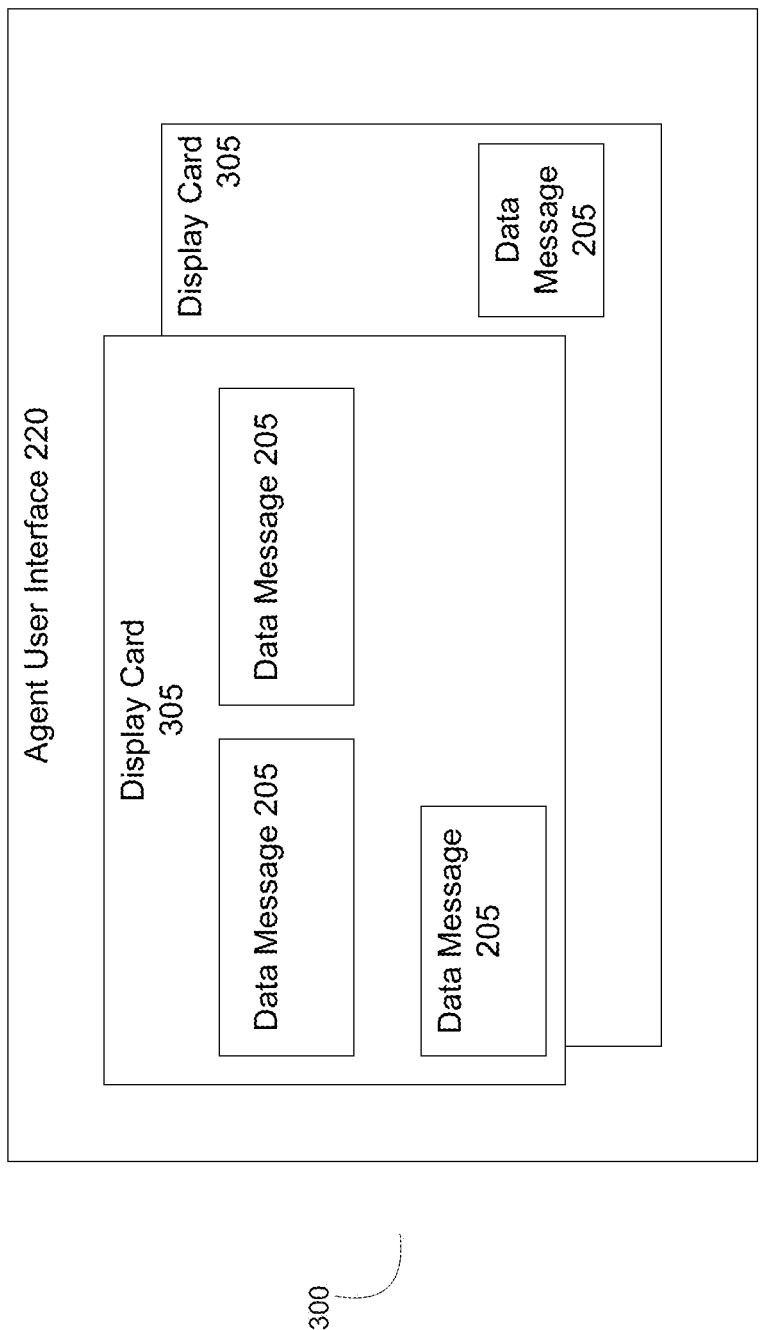
FIG. 3 is an example illustration of a data message display on a computing device in a contact center environment.

FIG. 3 depicts a data message display 300 on the contact center agent computing device 135 in, for example, a contact center environment. The display 300 can be rendered by the live interaction component 145 (e.g., a browser-based application) and can be part of or include the agent user interface 220. Data messages 205 or other portions of the sessions 215 can be displayed in at least one display card 305 of the agent user interface 220. The display card 305 can represent sessions 215 or portions thereof. The agent user interface 220 can include a plurality of display cards 305, each representing different sessions 215 or representing different portions of the same session 215.

The intermediary device 105 can control the positioning, juxtaposition, and display of the display cards 305 or of the data messages 205 within the display cards 305. For example, the contact center agent computing device 135 (or the intermediary device 105) can execute a script or application that positions the display cards 305 within the agent user interface 220 so that they do not overlap each other. The contact center agent computing device 135 or the intermediary device 105 can also position the display cards 305 within the agent user interface 220 so that they do at least partially (e.g., partially or completely) overlap each other.

Display cards 305 associated with the same client computing device 130, or having content related to the same subject matter can partially overlap each other to preserve available display space on the display of the contact center agent computing device 135. The contact center agent computing device 135 (or the intermediary device 105) can execute a script or application that sorts or positions the display cards 305 based on categories associated with the display cards, such as subject matter, client computing device 130, urgency, or a time since the display card 305 was received, rendered, or last accessed by the client computing device 130. The agent user interface 220 or other display at the contact center agent computing device 135 that includes the display cards 305 can be browser based or non-browser based.

The session assignment mechanism 110 can provide the session 215, such as a modified pre-existing session, to the live interaction component 145 for display as the display card 305 by the agent user interface 220. The display card 305 can be displayed in juxtaposition with one or more additional display cards 305 within the agent user interface 220 of the contact center agent computing device 135. The display cards 305 can correspond to different sessions 215. For example at least two of the display cards 305 can at least partially overlap each other in the agent user interface 220.

The agent or operator interfacing with the agent user interface 220 can select one or more data messages 205 from one or more display cards 305, corresponding to one or more sessions 215 and can respond to a data message 205 of the session 215 directly, e.g. via the response message 245, or can provide at least one data message to the automated assistant 230 for generation of the auto response 240. Via the agent user interface 220, the agent can also decline a display card 305, data message 205, or session 215. An indication of this refusal to attend to a data message 205 can be provided to the session lobby mechanism 120 (or other intermediary device 105 component). Based on this refusal, the session assignment mechanism 125 can assign the session 215 to a different contact center agent computing device 135.

Figure 4:
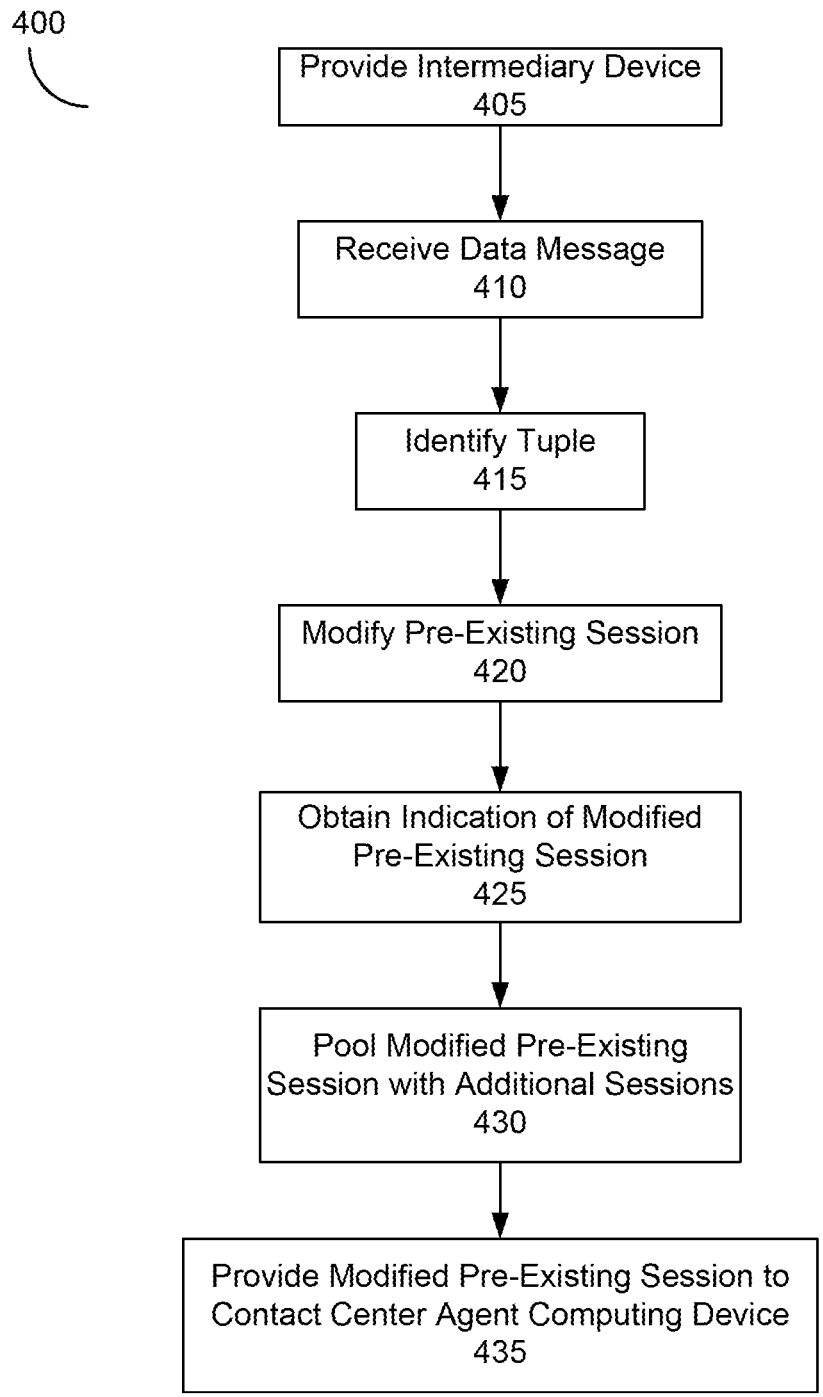
FIG. 4 is a flow diagram depicting an example method of managing data messages.

FIG. 4 depicts an example method 400 of managing data messages. The method can include providing the intermediary device 105 (ACT 405). The intermediary device 105 can be disposed in a data communication path between the electronic communications network 140 and the client computing device 130, for example in a contact center environment. The intermediary device 105 can include at least one session management mechanism 110, at least one session storage unit 115, at least one session lobby mechanism 120, or at least one session assignment mechanism 125. The method 400 can receive at least one data message (ACT 410). The data message can include at least one characteristic. For example, the intermediary device 105 can receive at least one data message such as a text message from the client computing device 130 via the electronic communications network 140. The method 400 can identify at least one tuple (ACT 415). The tuple can indicate one or more characteristics of the data message, such as source or destination of the message, the format of the data message, the app or program (e.g., application platform) used to generate or transmit the data message, the device or type of device of the client computing device 130, IP address, an end user associate with the data message, or other information.

The session management mechanism 110 can identify the tuple of the data message, and can determine that the tuple (and therefore the data message) corresponds to a pre-existing session (ACT 415). For example at least one characteristic indicated by the tuple of the data message (e.g., a handle of an end user, account number, or source identifier) can match at least one characteristic of one or more data messages of the pre-existing session (ACT 415). One or more data messages of the pre-existing session can have the same tuple (or can share at least one characteristic) as the inbound data message under examination by the session management mechanism 110. The intermediary device 105 can identify this commonality (ACT 415) between the inbound data message and a pre-existing session. When there is no commonality, the intermediary device 105 can identify the absence of the tuple match between the inbound data message and characteristics of pre-existing sessions. The absence of a tuple match can indicate that the data message is a first message of a new session or otherwise belongs to a new session, which can be stored in the session storage unit as part of the lobby construct with other sessions.

The method 400 can modify at least one pre-existing session (ACT 420). For example, the session management mechanism 110 can add at least one new data message to a pre-existing session. For example, responsive to an indication that a data message corresponds or otherwise relates to a pre-existing session, the session management mechanism 110 can add the data message to a pre-existing session (ACT 420). For example, the session management mechanism 110 can link or provide an indicator that associates the data message with the pre-existing session. The indicator can be stored in the session storage unit 115. The method 400 can obtain an indication of the modified pre-existing session (ACT 425). For example, the session lobby mechanism 120 can obtain from the session storage unit 115 an indicator of the modified pre-existing session and can pool the modified pre-existing session together with other sessions (ACT 430). For example the lobby mechanism 120 can create a registry or other construct that lists pre-existing sessions, stored in the session storage unit 115. The pool or lobby of pre-existing sessions can indicate a plurality of different text message based conversations between a plurality of client computing devices 130 and contact center agent computing devices 135. In some examples, all pre-existing sessions can be indicated by a single lobby construct, managed by the session lobby mechanism 120.

The method 400 can provide the modified pre-existing session to at least one contact center agent computing device 135 (ACT 435). For example, the session assignment mechanism 125 can assign or provide the modified pre-existing session to at least one live interaction component 145 of a contact center agent computing device 135. Providing the modified (or any other) pre-existing session to the contact center agent computing device 135 (ACT 435) can include providing a portion of at least one text message, including metadata, identification information, header information, or body information of the data message, to the contact center agent computing device 135 (ACT 435). The data of the pre-existing session provided to the contact center agent computing device 135 can be provided to the live interaction component 145, for example for display by a user interface or other display of the contact center agent computing device 135.

The intermediary device 105 can manage messaging based communications in help desk, customer service, or other contact center settings between human members of an organization (e.g., contact center agents), automated assistants or bots and end users of the client computing devices 130. The intermediary device 105 facilitates data message 205 communications based on text messaging instead of live voice communications. The intermediary device 105 connects to one or more electronic communications networks 140, such as messaging networks, short message service networks, or social messaging networks, and establishes communications sessions 215 between two or more parties. The intermediary device 105 can establish the sessions 215 using messaging. The intermediary device 105 supports transitions to and from humans and automated assistants in a single session 215. For example, the agent can provide the automation request 235 to the automated assistant 230 to generate the auto response message 240. The intermediary device 105 can collect information from the session 215, and can provide members of the organization (e.g., contact center agents at the computing devices 135) the ability to edit the information before or after it is stored (e.g., in the session storage unit 115) or forwarded into other information systems. In addition, the intermediary device 105 can recall messaging content from pre-existing sessions and can combine the pre-existing session with (or modify it to include) other information services to provide real time advice and coaching to the controlling agent at the computing device 135.

The intermediary device 105 can attach to or communicate with messaging networks 140 to establish communications sessions on behalf of a network handle, such as @testcorp for a social network or +15085551212 for a short message service. At the beginning of a session with an outside party (e.g., an end user at the client computing device 130), the intermediary device 105 can transfer the outside party to an external automated digital assistant 230 for the initial phase of a session 215. At the end of the interaction with the digital assistant 230, or at the request of the outside party, the intermediary device 105 can place the outside party into a lobby construct. The lobby construct can include data messages or indications of the outside parties that have not been matched with human members of an organization. The intermediary device 105 can select the member of the organization (e.g., a contact center agent) to continue the session 215, as a conversation. During the conversation, the contact center agent computing device 135 or the automated assistant 230 can transfer the session to other external automated digital assistants 230, for either short conversational automation such as the collection of shipping addresses, resolution of billing issues or the reporting of an incident, each of which will return to the requesting party, or for longer form task automation which might not return at all.

The control and integration of automated assistants 230 provided by the intermediary device 105 can be more efficient than contact center environments that lack the intermediary device. For example, by decoupling the human management of automation assistants from the automation assistants themselves, each can independently scale in terms of capacity and functionality, reducing the complexity of the overall solution though minimization of accidental complexity between them. Further, automation assistants can be inefficient relative to humans in emotional estimation and management, while live chat solutions are inefficient in terms of task productivity in comparison to automated assistants. The intermediary device 105 manages automated assistants 230 and optimizes the ability for the agent at the computing device 135 to control, direct or interpret the emotional content of the data messages 205, while maintaining the efficiencies of automation. Also, the intermediary device 105 can provide data messages 105 in an asynchronous manner, which provides substantial user experience benefits to the outside party. For example, sessions 215 can last for days, but the end user at the client computing device 130 does not have to remain constantly engaged.

Figure 5:
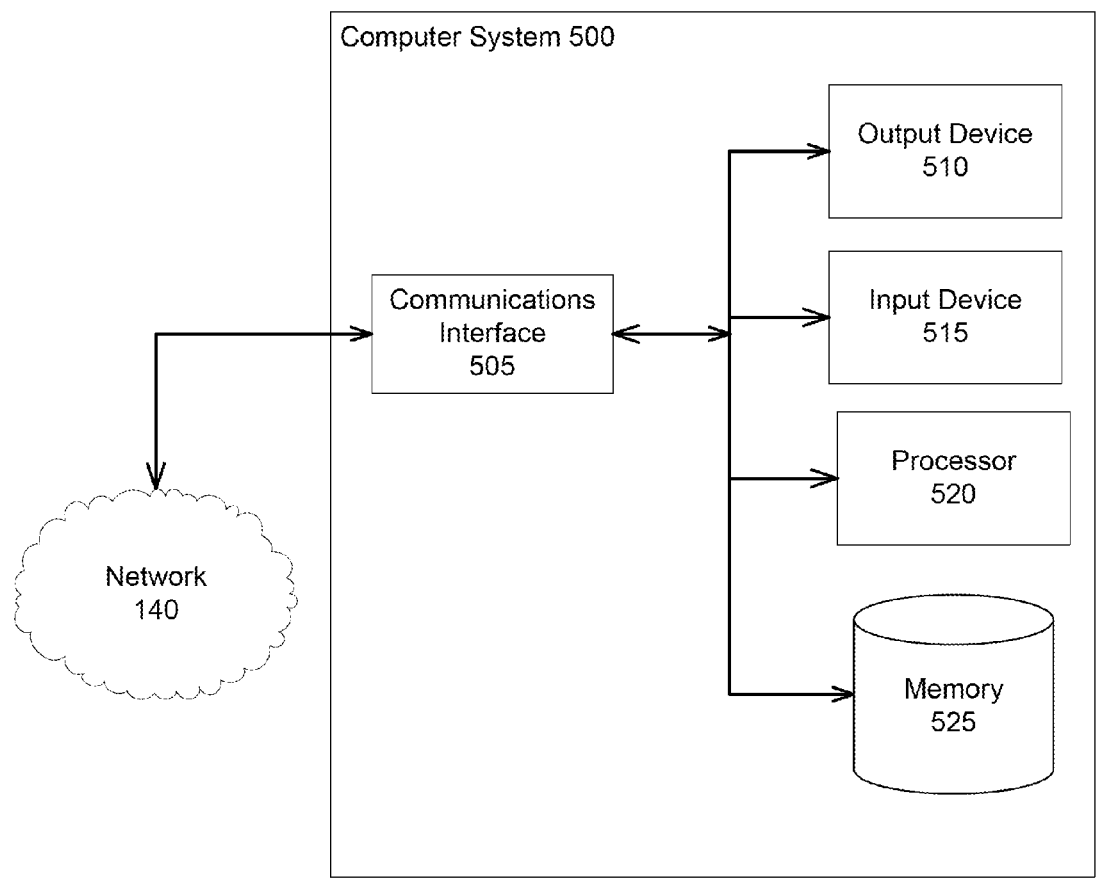
FIG. 5 is a block diagram illustrating a general architecture for a computer system that may be employed to implement elements of the systems and methods described and illustrated herein.

FIG. 5 shows the general architecture of an illustrative computer system 500 that can implement any of the computer systems discussed herein, including system 100 and the intermediary device 105 and its components such as the session management mechanism 110, the session lobby mechanism 120 or the session assignment mechanism 125. The computer system 500 can provide information via the network 140, for example to route data messages to or from contact center agent computing devices 135 in a contact center environment. The computer system 500 can include one or more processors 520 communicatively coupled to at least one memory 525, one or more communications interfaces 505, one or more output devices 510 (e.g., one or more display units) or one or more input devices 515. The processors 520 can be included in the intermediary device 105 or the other components of the system 100 such as the session management mechanism 110, the session lobby mechanism 120 or the session assignment mechanism 125.

The memory 525 can include computer-readable storage media, and can store computer instructions such as processor-executable instructions for implementing the operations described herein. The system 100, or the intermediary device 105, the session storage unit 115, client computing device 130, or the contact center agent computing device 135 can include the memory 525 to store data messages, message characteristics, tuple information, sessions, or session data associated with the contact center environment or with communications between the client computing device 130 and the contact center agent computing device 135, for example. The at least one processor 520 can execute instructions stored in the memory 525 and can read from or write to the memory information processed and or generated pursuant to execution of the instructions.

The processors 520 can be communicatively coupled to or control the at least one communications interface 505 to transmit or receive information pursuant to execution of instructions. For example, the communications interface 505 can be coupled to a wired or wireless network (e.g., network 140), bus, or other communication means and can allow the computer system 500 to transmit information to or receive information from other devices (e.g., other computer systems). One or more communications interfaces 505 can facilitate information flow between the components of the system 100. The communications interface 505 can (e.g., via hardware components or software components) to provide a website or other interface (e.g., the live interaction component 145) as an access portal to at least some aspects of the computer system 500 or system 100. Examples of communications interfaces 505 include user interfaces.

The output devices 510 can allow information to be viewed or perceived in connection with execution of the instructions. The input devices 515 can allow a user to make manual adjustments, make selections, enter data or other information, or interact in any of a variety of manners with the processor during execution of the instructions.

The subject matter and the operations described herein can be implemented in digital electronic circuitry, or in computer software, firmware, or hardware, including the structures disclosed in this specification and their structural equivalents, or in combinations of one or more of them. The subject matter described in this specification can be implemented at least in part as one or more computer programs, e.g., one or more modules of computer program instructions, encoded on computer storage medium for execution by, or to control the operation of, data processing apparatus. The program instructions can be encoded on an artificially-generated propagated signal, e.g., a machine-generated electrical, optical, or electromagnetic signal that is generated to encode information for transmission to suitable receiver apparatus for execution by a data processing system or apparatus. A computer storage medium can be, or be included in, a computer-readable storage device, a computer-readable storage substrate, a random or serial access memory array or device, or a combination of one or more of them. While a computer storage medium is not a propagated signal, a computer storage medium can be a source or destination of computer program instructions encoded in an artificially-generated propagated signal. The computer storage medium can also be, or be included in, one or more separate physical components or media (e.g., multiple CDs, disks, or other storage devices). The operations described in this specification can be implemented as operations performed by a data processing apparatus on data stored on one or more computer-readable storage devices or received from other sources.

The term "data processing system" or "computing device" "mechanism" "module" "engine" or "component" encompasses apparatuses, devices, and machines for processing data, including by way of example a programmable processor, a computer, a system on a chip, or multiple ones, or combinations, of the foregoing. The apparatuses can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination thereof. The apparatus and execution environment can realize various different computing model infrastructures, such as web services, distributed computing and grid computing infrastructures. The system 100 and components such as the intermediary device 105 can include or share one or more data processing apparatuses, systems, computing devices, or processors.

A computer program (also known as a program, software, software application, app, script, or code) can be written in any form of programming language, including compiled or interpreted languages, declarative or procedural languages, and can be deployed in any form, including as a stand-alone program or as a module, component, subroutine, object, or other unit suitable for use in a computing environment. A computer program can correspond to a file in a file system. A computer program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers of the intermediary device 105 that are located at one site or distributed across multiple sites and interconnected by a communication network.

The processes and logic flows described in this specification can be performed by one or more programmable processors executing one or more computer programs (e.g., components of the intermediary device 105) to perform actions by operating on input data and generating output. The processes and logic flows can also be performed by, and apparatuses can also be implemented as, special purpose logic circuitry, e.g., an FPGA (field programmable gate array) or an ASIC (application-specific integrated circuit). The components of the system 100 can be interconnected by any form or medium of digital data communication, e.g., a communication network. Examples of communication networks include a local area network ("LAN") and a wide area network ("WAN"), an inter-network (e.g., the internet), or peer-to-peer networks (e.g., ad hoc peer-to-peer networks).

The subject matter described herein can be implemented in a computing system that includes a back-end component, e.g., as a data server, or that includes a middleware component, e.g., an application server, or that includes a front-end component, e.g., a client computer having a graphical user interface or a web browser through which a user can interact with an implementation of the subject matter described in this specification, or a combination of one or more such back-end, middleware, or front-end components.

The computing system such as system 100 can include clients and servers. A client and server are generally remote from each other and typically interact through a communication network (e.g., the network 140). The relationship of client and server can arise by virtue of computer programs running on the respective computers and having a client-server relationship to each other. In some implementations, a server transmits data (e.g., a data message) to a client device (e.g., to the client computing device 130 or to the contact center agent computing device 135 for purposes of displaying data to and receiving user input from a user interacting with the client device 130 or an agent interacting with the contact center agent computing device 135). Data generated at the client computing device 130 or at the contact center agent computing device 135 (e.g., a result of the user or agent interaction) can be received from the client computing device 130 or the contact center agent computing device 135 at the server (e.g., received by the intermediary device 105).

While operations are depicted in the drawings in a particular order, such operations are not required to be performed in the particular order shown or in sequential order, and all illustrated operations are not required to be performed. Actions described herein can be performed in a different order.

The separation of various system components does not require separation in all implementations, and the described program components can be included in a single hardware or software product. For example, the session management mechanism 110, the session lobby mechanism 120, or the session assignment mechanism 125 can be a single module, a logic device having one or more processing circuits, or part of one or more servers of the intermediary device 105.

Having now described some illustrative implementations, it is apparent that the foregoing is illustrative and not limiting, having been presented by way of example. In particular, although many of the examples presented herein involve specific combinations of method acts or system elements, those acts and those elements may be combined in other ways to accomplish the same objectives. Acts, elements and features discussed in connection with one implementation are not intended to be excluded from a similar role in other implementations.

The phraseology and terminology used herein is for the purpose of description and should not be regarded as limiting. The use of "including" "comprising" "having" "containing" "involving" "characterized by" "characterized in that" and variations thereof herein, is meant to encompass the items listed thereafter, equivalents thereof, and additional items, as well as alternate implementations consisting of the items listed thereafter exclusively. In one implementation, the systems and methods described herein consist of one, each combination of more than one, or all of the described elements, acts, or components.

Any references to implementations or elements or acts of the systems and methods herein referred to in the singular can also embrace implementations including a plurality of these elements, and any references in plural to any implementation or element or act herein may also embrace implementations including only a single element. References in the singular or plural form are not intended to limit the presently disclosed systems or methods, their components, acts, or elements to single or plural configurations. References to any act or element being based on any information, act or element may include implementations where the act or element is based at least in part on any information, act, or element.

Any implementation disclosed herein may be combined with any other implementation, and references to "an implementation," "some implementations," "an alternate implementation," "various implementations," "one implementation" or the like are not necessarily mutually exclusive and are intended to indicate that a particular feature, structure, or characteristic described in connection with the implementation may be included in at least one implementation or embodiment. Such terms as used herein are not necessarily all referring to the same implementation. Any implementation may be combined with any other implementation, inclusively or exclusively, in any manner consistent with the aspects and implementations disclosed herein.

References to "or" may be construed as inclusive so that any terms described using "or" may indicate any of a single, more than one, and all of the described terms. References to at least one of a conjunctive list of terms may be construed as an inclusive OR to indicate any of a single, more than one, and all of the described terms. For example, a reference to "at least one of 'A' and 'B'" can include only 'A', only 'B', as well as both 'A' and 'B'. Such references used in conjunction with "comprising" or other open terminology can include additional items.

Where technical features in the drawings, detailed description or any claim are followed by reference signs, the reference signs have been included to increase the intelligibility of the drawings, detailed description, or claims. Accordingly, neither the reference signs nor their absence have any limiting effect on the scope of any claim elements.

The systems and methods described herein may be embodied in other specific forms without departing from the characteristics thereof. For example, the session assignment mechanism 125 and the session lobby mechanism 120 can be on separate servers of the intermediary device 105, which increases scalability and speed of the intermediary device 105 due to distributed or parallel processing. The foregoing implementations are illustrative rather than limiting of the described systems and methods. Scope of the systems and methods described herein is thus indicated by the appended claims, rather than the foregoing description, and changes that come within the meaning and range of equivalency of the claims are embraced therein.

What is claimed is:

1. An intermediary device to route text based data messages, comprising:
   an intermediary device disposed in a data communication path between an electronic communications network and a client computing device, the intermediary device including at least one of a session management mechanism, a session storage unit, a session lobby mechanism, and a session assignment mechanism;
   the intermediary device disposed to receive, via the electronic communications network, a data message having a characteristic;
   the session management mechanism identifies a subject matter match between subject matter of the data message and subject matter of a pre-existing session, and the session management mechanism identifies, based on the characteristic of the data message and a characteristic of the pre-existing session, a tuple, the tuple and the subject matter match between subject matter of the data message and subject matter of the pre-existing session both indicating that the data message corresponds to the pre-existing session; and the session management mechanism modifies the pre-existing session to generate a modified pre-existing session that includes the data message;
   the session lobby mechanism obtains from the session storage unit an indication of the modified pre-existing session and pools the modified pre-existing session with a plurality of additional sessions; and
   responsive to a selection received by the session assignment mechanism from a live interaction component of a contact center agent computing device, the session assignment mechanism provides the modified pre-existing session to the live interaction component of the contact center agent computing device for display by a user interface of the contact center agent computing device.

2. The intermediary device of claim 1, wherein the characteristic of the data message includes one of a handle identifier, a device identifier, and an account identifier.

3. The intermediary device of claim 1, wherein the characteristic of the pre-existing session includes a destination identifier.

4. The intermediary device of claim 1, wherein the contact center agent computing device retrieves the modified pre-existing session from the session lobby mechanism.

5. The intermediary device of claim 1, wherein the data message is a first data message, comprising:
the intermediary computing device disposed to receive a second data message;
the session management mechanism identifies an absence of a tuple match based on a characteristic of the second data message and respective characteristics of the plurality of additional sessions; and
based on the absence of the tuple match, the session management mechanism identifies the second data message as a new session.

6. The intermediary device of claim 5, comprising:
the session lobby mechanism configured to obtain from the session storage unit an indication of the new session and to pool the new session with the plurality of additional sessions.

7. The intermediary device of claim 1, wherein the session assignment mechanism provides the modified pre-existing session to the live interaction component as a display card for display juxtaposed on the user interface of the contact center agent computing device with a plurality of additional display cards, the plurality of additional display cards each corresponding to a respective session.

8. The intermediary device of claim 7, wherein at least two of the plurality of additional display cards at least partially overlap each other in the user interface.

9. The intermediary device of claim 1, comprising:
the session management mechanism configured to provide the modified pre-existing session to the session storage unit for storage.

10. The intermediary device of claim 1, wherein the data message is a first data message, comprising:
the session management mechanism configured to identify the characteristic of the first data message as a characteristic of a first application platform;
the intermediary device disposed to receive, via the electronic communications network, a second data message having a second characteristic;
the session management mechanism configured to identify the second characteristic as a characteristic of a second application platform; and
the session management mechanism determines that the second data message corresponds to the pre-existing session based on the characteristic of the second platform and the characteristic of the pre-existing session.

11. The intermediary device of claim 1, wherein the data message is a first data message and the characteristic is a first characteristic, comprising:
the intermediary device disposed to receive, via the electronic communications network, a second data message having a second characteristic;
the session management mechanism configured to determine from the first characteristic and the second characteristic, that the first data message and the second data message both originated from the client computing device; and
responsive to the determination that that the first data message and the second data message both originated from the client computing device, the session management mechanism determines that the second data message corresponds to the pre-existing session.

12. The intermediary device of claim 1, wherein the data message is a first data message, the characteristic is a first characteristic, and the tuple is a first tuple, comprising:
the intermediary device configured to receive, via the electronic communications network, a second data message having a second characteristic;
the session management mechanism configured to identify, based on the second characteristic and the characteristic of the pre-existing session, a second tuple indicating that the second data message corresponds to the pre-existing session; and
the session management mechanism configured to further modify the modified pre-existing session to include the second data message.

13. The intermediary device of claim 12, wherein the first characteristic corresponds to a first application platform of the client computing device and the second characteristic corresponds to a second application platform of the client computing device.

14. The intermediary device of claim 12, comprising the session management mechanism configured to:
determine that the first characteristic indicates the client computing device and that the second characteristic indicates a second client computing device.

15. The intermediary device of claim 1, comprising:
subsequent to receipt of the modified pre-existing session by the live interaction component, the session management mechanism routes an automated message to the client computing device.

16. The intermediary device of claim 1, comprising:
the session management mechanism configured to obtain, from the contact center agent computing device, an indication of termination of the modified pre-existing session.

17. A method of managing, via an intermediary device, text based data messages, comprising:
providing an intermediary device to dispose in a data communication path between an electronic communications network and a client computing device, the intermediary device including at least one of a session management mechanism, a session storage unit, a session lobby mechanism, and a session assignment mechanism;
receiving, by the intermediary device, via the electronic communications network, a data message having a characteristic;
identifying, by the session management mechanism, a subject matter match between subject matter of the data message and subject matter of a pre-existing session, and identifying based on the characteristic of the data message and a characteristic of the pre-existing session, a tuple, the tuple and the subject matter match between subject matter of the data message and subject matter of the pre-existing session both indicating that the data message corresponds to the pre-existing session;
modifying, by the session management mechanism, the pre-existing session to generate a modified pre-existing session that includes the data message;
obtaining, by the session lobby mechanism from the session storage unit an indication of the modified pre-existing session and pooling the modified pre-existing session with a plurality of additional sessions; and providing, by the session assignment mechanism, responsive to a selection received by the session assignment mechanism from a live interaction component of a contact center agent computing device, the modified pre-existing session to the live interaction component of the contact center agent computing device for display by a user interface of the contact center agent computing device.

18. The method of claim 17, comprising:
receiving, by the intermediary computing device, a second data message;
identifying, by the session management mechanism, an absence of a tuple match based on a characteristic of the second data message and respective characteristics of the plurality of additional sessions; and
based on the absence of the tuple match, identifying, by the session management mechanism, the second data message as a new session.

19. The method of claim 17, wherein the data message is a first data message, comprising:
identifying, by the session management mechanism, the characteristic of the first data message as a characteristic of a first application platform;
receiving, by the intermediary device, via the electronic communications network, a second data message having a second characteristic;
identifying, by the session management mechanism, the second characteristic as a characteristic of a second application platform; and
determining, by the session management mechanism, that the second data message corresponds to the pre-existing session based on the characteristic of the second platform and the characteristic of the pre-existing session.

20. The method of claim 17, wherein the data message is a first data message and the characteristic is a first characteristic, comprising:
receiving, by the intermediary device, via the electronic communications network, a second data message having a second characteristic;
determining, by the session management mechanism, from the first characteristic and the second characteristic, that the first data message and the second data message both originated from the client computing device; and
responsive to the determination that that the first data message and the second data message both originated from the client computing device, determining, by the session management mechanism, that the second data message corresponds to the pre-existing session.

21. The intermediary device of claim 1, wherein the data message is a first data message and the tuple is a first tuple, comprising:
the intermediary device disposed to receive a second data message;
the session management mechanism configured to identify a direct match between a tuple of the second data message and a tuple of the pre-existing session and to determine that a tuple based match does not exist between the second data message and the pre-existing session due to differences in subject matter between the second data message and the pre-existing session.

* * * * *